United States Patent

Walisser et al.

[11] Patent Number: 5,952,440
[45] Date of Patent: Sep. 14, 1999

[54] WATER SOLUBLE AND STORAGE STABLE RESOLE-MELAMINE RESIN

[75] Inventors: Wayne R. Walisser, Floyds Knobs, Ind.; Calvin K. Johnson, Lockport, Ill.

[73] Assignee: Borden Chemical, Inc., Columbus, Ohio

[21] Appl. No.: 08/963,483

[22] Filed: Nov. 3, 1997

[51] Int. Cl.$^6$ .............................. C08G 8/10; C08G 8/28; C08G 14/10; C08L 61/06; C08L 61/14; C08L 61/34

[52] U.S. Cl. .................. 525/504; 525/516; 524/421; 524/423; 524/428; 524/596; 528/163

[58] Field of Search .................. 525/504, 516; 528/163; 524/421, 423, 428, 596

[56] References Cited

U.S. PATENT DOCUMENTS

| | | | |
|---|---|---|---|
| Re. 30,375 | 8/1980 | Deuzeman et al. | 260/29.3 |
| 2,310,004 | 2/1943 | Widmer et al. | 524/35 |
| 3,223,668 | 12/1965 | Stalego | 260/29.3 |
| 3,616,179 | 10/1971 | McCombs et al. | 161/170 |
| 3,617,428 | 11/1971 | Carlson | 161/133 |
| 3,617,429 | 11/1971 | LeBlanc | 428/182 |
| 3,666,694 | 5/1972 | Ingram, II | 523/417 |
| 3,819,441 | 6/1974 | Fargo et al. | 156/167 |
| 3,862,060 | 1/1975 | Anderson et al. | 524/25 |
| 3,907,724 | 9/1975 | Higginbottom | 260/7 |
| 3,919,134 | 11/1975 | Higginbottom | 260/7 |
| 3,935,139 | 1/1976 | Ashall | 524/594 |
| 3,956,204 | 5/1976 | Higginbottom | 260/7 |
| 3,956,205 | 5/1976 | Higginbottom | 260/7 |
| 4,028,367 | 6/1977 | Higginbottom | 260/29.3 |
| 4,060,504 | 11/1977 | Higginbottom | 260/7 |
| 4,176,105 | 11/1979 | Miedaner | 260/29.3 |
| 4,525,492 | 6/1985 | Rastall et al. | 521/181 |
| 4,757,108 | 7/1988 | Walisser | 524/596 |
| 4,960,826 | 10/1990 | Walisser | 524/494 |
| 5,296,584 | 3/1994 | Walisser | 528/163 |
| 5,324,337 | 6/1994 | Helbing | 65/3.4 |
| 5,358,748 | 10/1994 | Mathews et al. | 427/389.8 |
| 5,368,803 | 11/1994 | Brow et al. | 264/257 |
| 5,505,998 | 4/1996 | Mathews et al. | 427/389.8 |
| 5,538,761 | 7/1996 | Taylor | 427/389.8 |
| 5,708,121 | 1/1998 | Parks et al. | 528/163 |

FOREIGN PATENT DOCUMENTS 2143601  2/1995  Canada.

OTHER PUBLICATIONS

U.S. Ser. No. 08/704, 259 of Aug. 28, 96 to Wayne R. Walisser.

Primary Examiner—Vasu Jagannathan
Assistant Examiner—Callie Shosho
Attorney, Agent, or Firm—George P. Maskas; Kenneth P. Van Wyck

[57] ABSTRACT

A curable, alkaline, melamine modified phenol-formaldehyde resin is prepared from an initial phenol-formaldehyde resole resin containing from 0.5 to 2.5 percent of free formaldehyde by scavenging formaldehyde with 1 to 12 parts of melamine for each 100 parts of the initial resin wherein the molar ratio of formaldehyde to melamine is 0.2 to 1.5 moles of formaldehyde for each mole of melamine to reduce the free formaldehyde to less than 70% of that in the initial resin and prepare a storage stable resin which contains less than 0.7% of free formaldehyde and which maintains its stability under application conditions. An ammonium salt of strong acid and additional water is incorporated in the melamine modified resin to prepare an alkaline binder. The binder is sprayed on to fiberglass with low formaldehyde emissions, good stability and rapid cure in the acid range.

26 Claims, No Drawings

WATER SOLUBLE AND STORAGE STABLE RESOLE-MELAMINE RESIN

FIELD OF THE INVENTION

This invention relates to the preparation of alkaline phenol-formaldehyde resole resins containing free formaldehyde in which melamine has been added and reacted with the free formaldehyde to prepare a melamine modified resin. This melamine modified phenol-formaldehyde resin can be used in the manner of conventional phenol-formaldehyde resole resins such as an adhesive. By the term "alkaline" is meant a resin having a pH above 7 such as a pH of 8 or above. The phenol-formaldehyde resin prior to reaction with melamine is referred to herein as the fundamental resin.

In a preferred embodiment, the above melamine modified resin is diluted with water and an ammonium salt of a strong acid is included in the composition as a latent acid catalyst to prepare a fiberglass binder. The binder maintains an alkaline pH after the addition of the latent acid catalyst. The amount of latent acid catalyst is sufficient upon heating and evaporation of the ammonia for the acid of the latent catalyst which remains in the composition to impart an acid pH of less than 6 to the composition. The binder is particularly useful in binding glass fibers such as glass fiber thermal insulation, glass fiber acoustical insulation, glass fiber molded products (such as automotive roof and hood liners) and glass wool.

Phenol-formaldehyde resins which contain formaldehyde scavengers such as melamine, urea, ammonia and the like have been used as binders in the past. However, such resins and their use suffer from various shortcomings. Illustratively, U.S. patents to Higgenbottom such as U.S. Pat. No. 3,907,724 of Sept. 23, 1975; U.S. Pat. No. 3,956,204 of May 11, 1976; U.S. Pat. No. 3,956,205 of May 11, 1976; U.S. Pat. No. 4,028,367 of Jun. 7, 1977; and U.S. Pat. No. 4,060,504 of Nov. 29, 1977 have various shortcomings such as: the need for emulsifiers to stabilize the resin; low water tolerance; the need to initially prepare a novolac which is converted to a resole; the use of scavengers which are not stable such as those of ammonia, urea, and sodium sulfite; the lack of a latent acid to provide a pH of less than 6 upon the evaporation of the ammonia; large quantities of free formaldehyde in the resole resin prior to reaction with the melamine; or curing of the resin under alkaline conditions.

U.S. Pat. No. 4,757,108 of Jul. 12, 1988 to W. R. Walisser modifies a phenol-formaldehyde resin with urea, goes through an acidification stage and then neutralizes to a basic pH before contacting the material to be bonded.

U.S. Pat. No. 4,960,826 of Oct. 2, 1990 to W. R. Walisser. The mole ratio of melamine to free formaldehyde in this 826 patent varies over a broad range. The resin is initially basic, it is then made acidic and subjected to acid conditioning after which it is again made basic before application to glass fibers wherein it cures under alkaline conditions. Furthermore, formaldehyde emissions on curing of the resin are much higher at pH above 7 as compared to below 7 in the presence of melamine.

U.S. Pat. No. 5,296,584 of Mar. 22, 1994 to W. R. Walisser is concerned with melamine solids suspended or dispersed in an acidic resole binder. A latent catalyst is not used.

U.S. Pat. No. 5,358,748 of Oct. 25, 1994 and U.S. Pat. No. 5,505,998 of Apr. 9, 1996 to Mathews et al have various shortcomings such as: use of a binder which is initially acidic; use of a phenol-formaldehyde resin which has from 1 to 5% of free formaldehyde; the absence of a latent catalyst; no apparent recognition of the need to react the melamine scavenger with the formaldehyde prior to preparation of the binder and application to fiberglass; and the phenol-formaldehyde solids in the binder are restricted to no more than about 5%.

Applicant's copending application Ser. No. 08/704,259 of Aug. 26, 1996 which is a continuation of Ser. No. 08/468,141 filed Jun. 6, 1995 describes a method for preparing an A-stage stabilized phenolic resin melamine dispersion which includes reaction of a portion of the melamine with formaldehyde to produce methylolmelamine in the phenolic resin to reduce the free formaldehyde content in the resin to less than 0.5% by weight of the composition.

The use of melamine solids in liquid phenolic resoles for glass fiber bonding has recently achieved significant commercial importance, principally because:

(i) Melamine reduces formaldehyde emission from the resole during C-stage (binder curing) operations;

(ii) Nitrogen in the resulting melamine/formaldehyde reaction product is bound in the highly thermally stable melamine molecule so that odoriferous decomposition products such as trimethylamine do not form during the normally encountered high temperature curing operations used to cure the binder. Odoriferous trimethylamine formation is a significant problem for certain applications when a urea containing phenolic resole is used as the binder since urea is a thermally unstable material;

(iii) Melamine itself has enough water solubility to enable its direct addition to dilute glass fiber binders;

(iv) Melamine itself forms stable dispersions with aqueous phenolic resoles; and (v) Melamine is a non-toxic, non-hazardous, relatively inexpensive, high tonnage chemical.

The terms A-stage, B-stage, and C-stage resin in relation to the phenol-formaldehyde and the melamine modified phenol-formaldehyde resin as well as the melamine modified resin in the binder have their usual meaning as with conventional phenol-formaldehyde resole (one step) resins.

Most of the older prior art, prior to 1992, was concerned with providing melamine to the binder in the form of the water soluble methoxy methyl melamine syrups or as methylolmelamine where the melamine was compounded with relatively high free formaldehyde containing resoles since methylolmelamine is also water soluble. Prior to about 1990 such melamine was generally being provided in combination with urea to boost the thermal performance, e.g. anti-punking, of otherwise standard phenolic resole urea binders.

U.S. Pat. No. 4,960,826 was new art that provided low temperature safe storage stable resole melamine compositions. More recently, U.S. Pat. Nos. 5,296,584, 5,358,748 and 5,505,998 specifically excluded urea and appear to be the first resole melamine composition disclosed in the art that do not rely on some derivatized highly water soluble form of melamine with formaldehyde and more specifically provided melamine to the binder as free underivatized melamine crystals. U.S. Pat. No. 5,296,584 specifically teaches away from any A-stage pre-dissolution reaction of the melamine with the resole. U.S. Pat. No. 5,296,584 provides an unusually low free formaldehyde containing resole obtained by using high levels of alkali to make the resole which is then compounded with melamine to form stable dispersions.

It has, however, recently become apparent that a need exists for higher solids containing resole melamine binders in fully water soluble solution form particularly for the rotary process of fiber attenuation where binder solids contents are often in the range of from about 10 to 35%.

It is therefore one object of the present invention to provide a water soluble resole melamine binder that is miscible with water and has functional properties similar to those provided by U.S. Pat. Nos. 5,296,584, 5,358,748, 5,505,998 and U.S. patent application Ser. No. 08/704,257 of Aug. 28, 1996 to W. Walisser, namely, a binder that has:

(a) low formaldehyde emissions during C-staging;
(b) low trimethylamine emissions during C-staging; and
(c) good C-stage flow properties, i.e., which does not pre-cure and retains its good C-stage flow properties after the B-staged resinated wool is held in storage for extended periods of time such as those exceeding two weeks, such storage time being referred to as the useable shelf life of the resinated wool.

It is another object of the present invention to overcome some of he disadvantages of the above mentioned 584, 748 and 998 patents by providing a binder which:

(a) has a good A-stage binder shelf life at high binder solids content;
(b) avoids the corrosive acidic condition of the above mentioned 584, 748, and 998 patents and patent application 08/704,259 in the A-stage composition;
(c) reduces atmospheric formaldehyde emissions from the A-stage composition during B-staging;
(d) will pass through fine particle binder line filters and through fine tipped spray nozzles at high binder solids contents; such binder application equipment being different from the air atomized nozzles or spinning disc atomizers that can easily apply the dispersion claimed in U.S. Pat. No. 5,296,584;
(e) avoids the need for elevated temperature dilution water;
(f) avoids the need for any compounding or pre-mixing step with the formaldehyde scavenger immediately prior to application;
(g) is produced from a resin which has improved cold storage stability, namely, does not form sediments after prolonged storage times such as two weeks at temperatures below 40° F. (4.4° C.);
(h) is produced from a resin that is very low in free formaldehyde content; such resin being compatible for the purposes of the present invention with conventionally used latent acid catalysts such as ammonium sulfate wherein the thermally unstable hexamethylenetetramine does not form and the C-stage binder therefore remains free of odoriferous hexamethylenetetramine decomposition products such as trimethylamine; it should be noted that prior art phenolic resins which use urea to attain low levels of free formaldehyde in the resole resin are not suitable since urea contributes to the formation of odoriferous trimethyl amine; and
(i) avoids the acidic condition, limiting phenolic solubility of the above mentioned 584, 748 and 998 patents in the A-stage composition so that the fundamental phenolic resole for the purposes of the present invention may be condensed to a significantly greater degree and to a significantly lower free formaldehyde content to yield a final composition that in fact has limited acid water solubility but remains infinitely dilutable in the alkaline A-stage binder composition of the present invention.

SUMMARY OF THE INVENTION

In one aspect of this invention, there is provided an alkaline, low free formaldehyde phenol-formaldehyde resole resin containing the reaction product of melamine and free formaldehyde of the resole resin wherein the resin is storage stable and has a high water tolerance under conditions of applying the resin.

In another aspect, this invention provides an alkaline melamine modified phenol-formaldehyde type resin binder containing a high percentage of phenol-formaldehyde solids, is non-corrosive and stable and contains a latent acid.

In still another aspect, this invention provides a method for binding fiberglass by spraying the alkaline melamine modified binder on glass fibers in a heated atmosphere whereby a portion of water from the binder and ammonia from the latent acid evaporate so as to lower the pH of the binder at the time it is applied to the fiberglass while maintaining stability of the binder and inhibiting escape of melamine and formaldehyde.

In a further embodiment, this invention provides fiberglass with a B-stage phenol-formaldehyde type binder applied thereto which can have high phenol-formaldehyde resin solids and which has low formaldehyde emissions and can be cured rapidly to the C-stage.

In still a further embodiment, this invention provides a C-stage glass fiber composition comprising glass fibers shaped to a desirable configuration having a cured binder at the junctions of the fibers and wherein the cured composition has low formaldehyde and alkylamine emissions.

In additional aspects of this invention, methods are provided for preparing the compositions mentioned above.

DESCRIPTION OF THE PREFERRED EMBODIMENTS

The Fundamental Phenol-Formaldehyde Resin

The procedure for making the phenol-formaldehyde resin of this invention prior to modification with melamine, also referred to herein as the fundamental resin, entails reaction of phenol and formaldehyde in an aqueous medium on the basis of about one mole of phenol for each approximately 1.8 to 2.4 moles of formaldehyde, in the presence of a basic catalyst. The formaldehyde is conveniently added as an aqueous solution containing from about 30% to 50% by weight of formaldehyde. The temperatures of the condensation reaction of the formaldehyde with phenol can include those of about from 40° C. to 75° C. and preferably from about 50° C. to 70° C. and particularly from about 55 to 65° C. An alkaline pH, particularly a relatively high pH such as about 9 to 10.5 and preferably a pH of about 9.3 to 10 is employed. The relatively high pH serves to drive the reaction to low levels of free formaldehyde, i.e. uncombined formaldehyde. The condensation reaction is generally indicated by a decrease in the concentrations of formaldehyde and of phenol in the reaction mixture.

The resulting aqueous, alkaline resole resin is water soluble by virtue of containing large quantities of methylolated phenol residues and generally contains from about 35% to 65% by weight solids, preferably about 40 to 60% and particularly 45 to 55% by weight solids for in the fundamental resin as well as the subsequently produced melamine modified resin. Typically, the amount of water in the fundamental resin as well as the melamine modified resin will vary from about 35% to 65%, preferably 40% to 60% and particularly 45% to 55%. The resin solids will make up about 90% to about 95% of the total solids content in both the fundamental and the melamine modified resin. The amount of solids is assessed by standard industry methods, for example the standard oven solids test. The resins of this invention are referred to as aqueous in view of the use of water as solvent for the solids therein.

Typically, the amount of basic catalyst used in preparing the phenol-formaldehyde resin, also referred to herein as the fundamental resin, i.e., the resin prior to reaction with melamine, varies from about 0.01 to about 1 mole of catalyst for each mole of phenol and preferably from about 0.1 to 0.5 moles of the alkaline catalyst per mole of phenol.

Illustrative of the catalyst there can be mentioned oxides and hydroxides of alkali metals, alkaline earth metals, tertiary amines and mixtures thereof. Preferred catalysts include sodium hydroxide, potassium hydroxide and triethylamine.

The amount of free formaldehyde in the fundamental resin of this invention, i.e., the resin prior to reaction with melamine, will vary from about 0.5 to 2.5% by weight of the aqueous resin, preferably 0.7 to 2.0% and particularly from about 0.8 to 1.2%.

The quantity of free (uncombined) phenol in the fundamental resole resin, as well as in the melamine modified resin will vary from about 1 to 5%, preferably 1.5 to 3.5% by weight of the resin. Also, the following properties are substantially the same for both the fundamental resin and the melamine modified resin: a Brookfield viscosity of from about 10 to 100 cps at 25° C. and preferably a Brookfield viscosity of about 15 to 50 cps as measured with a No. 18 spindle at a speed of 60 rpm; a refractive index of about 1.4600 to 1.5200 and preferably about 1.4800 to 1.5000. Both the fundamental resin and the melamine modified resin are in the form of clear aqueous solutions.

The Melamine Modified Phenol-Formaldehyde Resin

In the preparation of the melamine modified resin, melamine is dissolved in the fundamental resin and reacted with free (uncombined) formaldehyde. Preferably, the amount of melamine dissolved in the fundamental resin is in a ratio of one mole of melamine for each 0.5 to 1.5 moles of free formaldehyde provided that the amount of melamine is from about 1 to 7 parts of melamine for each 100 parts of the fundamental resin.

The amount of melamine preferably reacted with the formaldehyde in the fundamental resin can also be stated as that of about 1 to 7 parts of melamine for each one hundred parts of the fundamental resin and within the mole ratio of about 0.5 to 1.5 moles of formaldehyde in the fundamental resin for each mole of melamine. Less than 1 part of melamine per 100 parts of the fundamental resin is insufficient to react with a sufficient amount of formaldehyde to provide the desirable properties of the resins of this invention whereas more than 7 parts of melamine per one hundred parts of resin destroys desirable properties such as resin stability on refrigerated storage of the melamine modified resin. Although resin storage stability is adversely affected by use of more than the 7 parts of melamine per one hundred parts of resin, such resin is still suitable and advantageous for use when storage stability is not a problem. Thus, for use as a binder when storage stability is not a problem, the amount of melamine reacted with the fundamental resin can vary from about 1 to 12 parts of melamine for each 100 parts, by weight, of resin and wherein about one mole of melamine is reacted with each 0.2 to 1.5 moles of formaldehyde.

The amount of free formaldehyde in the resin after reaction with melamine is less than about 0.7% by weight such as from about 0.01% to less than 0.5%, preferably from 0.05% to less than 0.4%. Any undissolved melamine is removed from the final product by filtration.

Reaction of formaldehyde with melamine produces methylolmelamines. However, as the free formaldehyde increases, the combined formaldehyde to melamine mole ratio increases irrespective of the amount of melamine added, i.e., for a given charged low formaldehyde (F) to melamine (M) mole ratio of 1:1, progressively larger and larger amounts of melamine remain undissolved after reaction of free formaldehyde with melamine, e.g., for 80 minutes at 60° C., with the melamine modified resin producing higher and higher dissolved F/M mole ratio products. In other words, while the amount of dissolved melamine in a given fundamental resin increases with increasing free formaldehyde content, the increase in the molar amount of dissolved melamine is not proportional with the molar increase in free formaldehyde. Thus, low free formaldehyde content, e.g., 2.5% or less, in the fundamental resin is needed for the preparation of safe, cold storage stable resole resins of the melamine modified resins.

The melamine is preferably added in aqueous solution and reacted with the free formaldehyde in the fundamental resin under reaction conditions such that the quantity of formaldehyde is reduced by reaction with the melamine. Such reaction conditions include an elevated temperature such as that of at least about 50° C. for a time sufficient to cause at least a 50% decrease in the quantity of free formaldehyde of the fundamental resin but the temperature and time of reaction should not be such as to advance the resin and destroy its water dilutability. A temperature above 50° C. such as that of from 50° C. to about 70° C. for about 15 minutes to about 3 hours preferably from about 50 to 100 minutes at such temperature and most preferably at a temperature of about 55 to 65° C. has been found satisfactory. The resinous reaction products of melamine with formaldehyde in this invention are methylolmelamines and particularly monomethylolmelamine. The monomethylolmelamine is more soluble, i.e., it does not readily form precipitates in cold storage, as compared to dimethylolmelamine. The methylolmelamines thus formed can still accept more formaldehyde and continue to act as formaldehyde scavengers, such as in the formation of higher methylolmelamines, e.g. dimethylolmelamine, trimethylolmelamine, tetramethylolmelamine, etc. The melamine modified resin of this invention will preferably contain a total of from about 2% to about 9% of methylolmelamines wherein about 2% to 7% of the methylolmelamines in the resin are monomethylolmelamine. In addition to reducing the free formaldehyde, the reaction of melamine with formaldehyde also reduces the amount of free melamine in the resin. The reaction of the melamine with the formaldehyde takes place in the alkaline pH of the fundamental resin and the melamine modified resin will typically have a pH the same as that of the fundamental resin, e.g., about 9 to 10.5 and preferably about 9.3 to about 10.

The reaction of the melamine with formaldehyde in the fundamental resin also affects the application of fiberglass binders since the formation of the melamine-formaldehyde reaction product reduces formaldehyde emissions to the atmosphere upon spraying of the binder on the glass fibers.

The preferred temperature range of about 50° C. to about 70° C. for the reaction of the melamine with the unreacted formaldehyde in forming the melamine modified resin is sufficient to reduce the quantity of unreacted formaldehyde in the resin without deleteriously affecting desirable properties of the resin such as its acid dilutability, also referred to herein as Acid Dilute, as measured by nephelometric turbidity units (NTU) or water dilutability at a pH of 7.5 to 9. The melamine modified resin of this invention will not form precipitates when one part of the resin is diluted with one to three parts of water at a pH of 7.5 to 9. Preferably the melamine modified resin will have an Acid Dilute (NTU) reading of less than about 500 such as 0.1 up to 500 and particularly 0.1 to 150. It should be noted that this specification contains two different tests which use NTU readings. One of the tests using the NTU readings is that of resin NTU wherein the low temperature stability of the fundamental or melamine modified resin is measured by the turbidity that may occur in the resin itself under agitated and refrigerated storage conditions. The other test using the NTU readings measures the stability of the melamine modified resin, again by the turbidity or haze it forms, upon being diluted with water under acid pH conditions.

The reaction of the melamine with the free formaldehyde in the fundamental resin reduces the concentration of free formaldehyde to less than about 70% of its concentration before reaction with the melamine and preferably reduces the formaldehyde concentration to less than about 50% and particularly less than about 40% of its concentration prior to reaction with the melamine. The reaction produces methylolmelamines and such methylolmelamines are believed to be principally monomethylolmelamine which has a higher solubility in alkaline aqueous media as compared to other methylolmelamines.

The A-stage liquid phenol-formaldehyde fundamental resin which has been reacted with melamine and contains melamine formaldehyde resin (also referred to herein as the melamine modified resin) will preferably have a water tolerance at a pH of 7.5 to 9 exceeding 5,000 percent by weight. The A-stage product of this invention refers to either (a) the aqueous solution containing the resinous reaction product of phenol and formaldehyde of the fundamental resin or (b) the aqueous solution of the fundamental resin containing the reaction product formed in-situ of melamine with free formaldehyde in the fundamental resin.

The reaction of the melamine with the formaldehyde in the fundamental resin prior to binder preparation solves at least two problems of the prior art as to stability of the resin and subsequent binders produced therefrom. One problem which is solved is the insolubility of the melamine as a scavenger. Thus, the solubility of melamine in the fundamental resin is less than about 0.3% at room temperature whereas the solubility of the reaction product of the melamine and formaldehyde is much greater such as 10 to 20 times greater, depending on the free formaldehyde content of the resole. At the same time, free formaldehyde is removed from the resin. Another problem which is solved is the prevention of precipitates of dimethylolmelamine and other higher methylolmelamines during storage of the melamine modified resin.

Although the melamine modified resin of this invention in the A-stage under alkaline conditions has a high water dilutability, water dilutability is a function of pH with the dilutability decreasing as the pH decreases as in the use of the binders of this invention which cure in the acid range. Another test used to measure water tolerance is the "acid dilutability test" which is measured in NTU (nephelometric turbidity units at pH 4.0). Readings of higher NTU's indicate greater turbidity and reduced solubility and the melamine modified resins of this invention will have NTU readings of less than about 500 since readings of 500 and over indicate lack of stability for use with binders which may have a lower pH after preparation.

Water tolerance of the fundamental as well as the melamine modified resin is determined at 25° C. by addition of water to the resin until a slight permanent haze forms. The tolerance is the weight of water present in the system at the haze point expressed as a percent by weight of the resin solids. Thus, where the haze point occurs when 100 parts by weight of water impart haze to 100 parts by weight of resin solids, the tolerance is 100 percent. The percent of water tolerance includes the dilution water added to the organic components plus water in the aqueous A-stage composition. When liquid has a water tolerance about or exceeding 5,000 percent by weight, it is said to be fully water dilutable or infinitely water dilutable or it is said to have infinite water dilutability. The fundamental resins and the melamine modified resins of this invention preferably have such infinite water dilutability at a pH of about 7.5 to 9.

A particular advantage of the melamine modified resin of this invention when used in the binder for glass fibers is its flowability on the glass during curing of the C-stage resin. The excellent flowability of the resin during the C-stage curing on glass fibers is due to the significantly lower formaldehyde to phenol mole ratio as compared to other low phenol containing resins. At the same time, the amount of phenol in the melamine modified resins of this invention is substantially higher, e.g. about 10 times higher than in most other glass binder resins as, for example, those resins used with urea in the manufacture of residential thermal fiberglass insulation. Also, since the resins of this invention do not contain urea, they do not solidify as readily as those containing urea before the resin spreads over the glass fibers.

A preferred melamine modified resin of this invention will have an acid dilutability of less than about 500 NTU, an infinite water dilutability at a pH of 7.5 to 9 and comprise a curable, clear, aqueous solution of a phenol-formaldehyde resole resin containing from about 2% to about 9% and preferably about 3% to 7% of methylolmelamines having a pH of about 9 to 10.5, less than 0.5% of free formaldehyde, about 40% to 60% of solids and about 40% to 60% of water.

In addition to the use of melamine for making the melamine modified resin which can subsequently be used in making the binder, another symmetrical triazine, namely, ammeline (4,6-diamino-s-triazin-2-ol) can be substituted for melamine to obtain the corresponding compositions to that of melamine and to attain the advantages of this invention.

Additional components may also be included in the A-stage melamine modified resin and may include common water treatment chemicals (precipitation threshold inhibitors) such as, for example, elastomeric latexes such as those of polyvinyl acetate, curing retarders such as, for example alpha-methyl glucoside which can be added to prevent binder pre-cure during manufacture of C-stage products in often very hot fiber collection chambers.

The Binder

The binder is prepared by adding a latent acid, water and optionally various additives, e.g. carbon black, to the melamine, or ammeline, modified resin. The latent acid is an ammonium salt of a strong acid. It is most desirable that the acid utilized for the ammonium salt (latent acid) have a pK value of a strong acid preferably a pK value of 2 or less. By pK is meant the extent of the dissociation or the strength of the acid. Preferred acids are sulfamic acid, oxalic acid which has a pK for the first hydrogen of 1.23, sulfuric acid, and the various position isomers of methanesulfonic acid, toluenesulfonic acid, e.g., p-toluenesulfonic acid and phenolsulfonic acid.

The quantity of acid in the latent acid needs to be sufficient to bring the pH of the binder down below 6 such as 5.5 or less such as 4 or less on evaporation of the ammonia. This quantity is generally obtained by adding sufficient latent acid so that upon evaporation of the ammonia, the acid which remains will neutralize the alkaline catalyst in the resin and then be sufficient to bring the pH down to below 6 during the C-stage cure. Typically, about 1 to 2% of acid based on the amount of resin solids in the binder is needed to bring the pH down to 5.5 or below after neutralizing the alkaline catalyst.

Typically, the quantity of ammonium salt of the acid will be from about 8 to 25% based on the weight of solids in the binder composition, preferably 9 to 13% and particularly 10 to 12% of the salt based on the weight of solids in the binder.

The use of a latent acid catalyst to bring the pH in the region of less than a pH of 6.0 accelerates the cure of resin in the binder. Also, the use of a pH of less than 6 enables the melamine-formaldehyde resin together with any unreacted melamine to scavenge more of the formaldehyde which may be released during the subsequent curing of resin in the binder.

The binder of this invention will have a pH of about 8 to 10.5 and preferably a pH of about 8.5 to 9.5. The alkaline pH provides stability to the binder by dramatically increasing shelf life versus an acidic pH such as a binder having a pH 5.5 and avoids the need for corrosion resistant equipment such as stainless steel tanks, pumps and spray nozzles which are needed for binders which are stored and applied in the acid range. Additionally, the alkaline pH increases the solubility of the resin in the binder.

The binder of this invention will typically contain approximately 0.5% to 35% solids by weight, preferably about 10% to 35% solids and particularly about 15% to 25% solids. Included in the solids will be resin solids of about 5% to 30% and preferably about 7 to 25% by weight. The binder can be sprayed onto fiberglass in order to achieve a solids content of from about 5% to about 30% and preferably 15 to 25% by weight of the cured fiberglass product. For building insulation, for example, a range of binder content between 3% and 7% by weight is common. For molded products such as automotive roof and hood liners the cured binder content of the article will normally vary from about 15% to 25% by weight of the article.

The binder of this invention is prepared by mixing latent catalyst and additional water to the melamine modified resin in the alkaline range. The alkaline binder will typically have a shelf life at 25° C. which is much greater than that of such binder in the acid range. The shelf life is measure by the turbidity developed in the binder over time.

The binders used in this invention are non-punking and possess high application efficiency. The term "punking" as used herein and in the art refers to the comparatively rapid oxidation of the binder, with the generation of heat, but without flame. Binders used heretofore, for this purpose, have included resins comprising a phenol-formaldehyde partial condensation product, a phenol-melamine formaldehyde partial condensation product and a phenol/urea/formaldehyde partial condensation product. Particular problems are however, present when the above resins are used as the bonding material in binders for the production of mats, bats, etc. Among these problems are: poor "punk" resistance; poor application efficiency; nonuniform cure of the binder; pre-cure problems, particularly when urea is used as a scavenger, which results in "spots" of pre-cured binder that decreases the tensile strengths of fiberglass bats and mats; and environmental control problems such as air and water pollution.

Application of the Binder to Glass Fibers

Any technique for the manufacture of glass fibers can be used in this invention. Two of the fiberization manufacturing techniques are known as the pot and marble process and the rotary process.

The rotary process is the preferred process for use in the manufacture of the glass fibers in this invention. In the rotary process, a stream of molten glass falls into a rotating spinner, which is a metal bowl with perforated sidewalls, and is extruded through the sidewall holes into many small streams. The small streams are attenuated by a combination of centrifical forces and aerodynamic drag forces and eventually cool to form fibers much smaller than the extrusion holes which typically range from 0.25 to 0.8 millimeters. The fibers generally leave the fiberizing equipment in an axial gas jet, and have binder sprayed on to them before being collected on a porous conveyor belt or other collection device spaced apart and under the fiberizing equipment. The atmosphere through which the binder is sprayed will often have a temperature of about 100° F. (37.8° C.) to about 200° F. (93.3° C.) and typically about 150° F. (65.5° C.). During evaporation of the B-stage binder and finally on curing of the C-stage binder the pH progressively decrease toward the acidic range and attains a pH of less than 6 such as a pH of 5.5 or less, e.g., a pH of 3.5

Typically, the binders are applied to the fiberglass shortly after the fibers have been produced in mid-air between the spinner and conveyor belt while the fibers are still warm and prior to collection on the conveyor belt. The fibers containing the sprayed binder are partially coated with a thin layer or droplets of the thermosetting melamine modified resin, which tend to accumulate at the junctions where fibers cross each other. A portion of the ammonia from the latent acid and some water evaporate from the aqueous binder due to the elevated temperatures of the environment between the binder spray nozzles and the area wherein the binder contacts the fiberglass. By heating the fiberglass such as by passing hot air therethrough after application of the binder, additional portions of the aqueous solvent and ammonia from the binder is evaporated, and the phenol-formaldehyde resole dries to the B-stage.

The amount of binder present on the fiberglass is a valuable control parameter. It can be determined by igniting a dry sample of the fiberglass at about 550° C. and measuring the weight loss. The fraction of product weight lost by ignition, usually expressed in percent, is called the loss on ignition, or LOI.

In addition to application of the binder by spraying, the binder can be applied by other means such as by impregnation of mats or blankets of fiberglass by the binder and then permitting the binder to dry such as by heating with hot air, etc. to form resinated glass wool. Resinated glass wool is generally an entangled mass or matrix of glass fibers having B-stage resin thereon which can be completely cured to provide C-stage resin for more permanent binding of the glass fibers to each other such as by application of heat in a press, mold or curing oven. Resinated wool of this invention such as that which is wound into rolls for storage and transportation had a shelf life of at least 2 months at about 25° C.

The B-Stage and C-Stage Fiberglass Compositions

After the application of the binder to the glass fibers, there is a partial curing to the B-stage resin. At this stage, the glass fiber composition has a viscous binder that will at least thin-out by being heated and flow to the junctions of the glass fibers to permit subsequent bonding and shaping to a desired configuration of the final cured product. The B-stage product facilitates handling and shipping of the glass fiber composition such as a mat or blanket, and the like.

The curing of the glass fiber composition with a binder applied thereto as described herein depends upon the temperature and time desired, the type of article being formed and the process for forming the article, e.g. whether pressure is being utilized, in forming the cured C stage-resin. For certain applications, the fiberglass containing the binder is heated for a time sufficient to advance the molecular weight of the resin and dry it to the B-state and then the product is shipped or stored pending curing at a later time to the C-stage. Thus the time and temperature for curing can vary over a wide range such as from less than 10 seconds to over two hours or more at temperatures of about 80° C. to 320° C. In a typical operation for the formation of headliners and hood insulation for automobiles, the cure is accomplished in from about 45 to 90 seconds at temperatures ranging from about 185° C. to about 285° C.

In order that those skilled in the art may more fully understand the invention presented herein, the following procedures and examples are set forth. All parts and percentages in the examples, as well as elsewhere in this application, are by weight and temperatures are in degrees centigrade (°C.) unless otherwise stated.

Determination of free formaldehyde is by ISO METHOD 9397:1989 (E) "Plastics—Phenolic resins—Determination of free formaldehyde content".

Stability of the resin by dilution with water under acidic conditions is measured by the acid dilutability test and reported in NTU's (nephelometric turbidity units). This test detects the presence of very small amounts of water insoluble materials in a water soluble resole resin when diluted with water under acidic conditions. The procedure is as follows: 4 g of the resin to be tested are placed in a 100 ml (milliliter) beaker. Distilled water, 80 ml's, is added into the beaker at room temperature. A stir bar is inserted in the beaker and mixing is started. pH electrodes are inserted in the diluted resin solution and the pH adjusted to 3.9 to 4.1 with 0.5 N (normal) hydrochloric acid. The solution is then permitted to stand without agitation for 10 minutes and the sample turbidity is measured in a turbidimeter and reported as acid dilutability NTU's or more simply as Acid Dilute NTU's.

Another turbidity test is that of resin turbidity. This test detects the presence of very small amounts of innate crystal formation in melamine modified resins that have this tendency, especially under agitated refrigerated storage conditions. The apparatus for this test are: a turbidimeter; 35 ml turbidimeter vial; and a 30 ml syringe. The procedure for this test is as follows: Transfer resin as received to turbidimeter vial and measure turbidity. Do not pre-adjust resin temperature. Report the NTU reading obtained.

EXAMPLE 1

Preparation of: (A) Phenol-formaldehyde resin; (B) Melamine modified phenol-formaldehyde resin; and (C)Shelf life of melamine modified resin (A) In a reactor equipped with agitator and reflux condenser there was added in the following order: 42.8 pounds (19.4 kg) of water; 171.2 pounds (77.6 kg) of phenol; 28.4 pounds (12.9 kg) of aqueous solution of potassium hydroxide containing 45% of potassium hydroxide; and 9.0 pounds (4.1 kg) of an aqueous solution of sodium hydroxide containing 50% of sodium hydroxide. The temperature was adjusted to 50° C. and 27 inches (686 mm)of mercury vacuum was applied. Then there was slowly added 229.4 pounds (104 kg) of an aqueous solution containing 50% of formaldehyde over about a 70 minute period. After addition of the formaldehyde, the heating was continued at 50° C. with the 27 inches (686 mm) of vacuum for another 15 minutes. The vacuum was then reduced to 24.5 inches (622 mm) to allow the temperature to rise to 60° C. in 30 minutes. The temperature was held at 60° C. for another four and one half hours to form 500 pounds of the fundamental phenol-formaldehyde resin, also referred to as the fundamental resin or base resin, which had: a free formaldehyde content of 0.9%; a free phenol content of 2.7%; a pH of 9.6; and an Acid Dilute of 0.7 NTU's.

(B) 19.2 pounds (8.7 kg) of melamine were added subsurface to the fundamental resin of (A) above in the reactor and the reaction mixture was agitated for another 30 minutes at 60° C. This provided 3.84 parts of melamine for each 100 parts of the fundamental resin. The mixture was then permitted to cool to 50° C. while maintaining the vacuum. The reaction mixture is then permitted to cool to below 25° C. while maintaining the vacuum. The agitator is then stopped and the vacuum is released and the product, namely, the melamine modified phenol-formaldehyde resin, simply referred to as the melamine modified resin, is discharged from the reactor.

(C) The melamine modified resin was a clear solution with 53.08% solids content of which 49.5% is resin solids and 3.5% is ash; a 2.1 to 1 molar ratio of charged formaldehyde to phenol; 2.6% free phenol; 0.3% free formaldehyde; a pH of 9.6; a refractive index of 1.49203; and an Acid Dilute of 2.4 NTU's. The resin was stable since it had no bottom sediments after two months in still (unagitated) storage in a 55 gallon (208.2 liters) drum at 40° F. (4.4° C.).

EXAMPLE 2

Shelf Life of Binders

Tests were made to determine shelf life at 25° C. of different binders having 10% solids prepared with the melamine modified resin of Example 1. Binder Sample A was alkaline with a pH of 8.9 whereas binder Sample B was acidic with a pH of 5.0. Sample A was prepared by taking 25 g of the melamine modified resin of Example 1 which contained in such sample 13.25 g of solids and adding to it 6.1 g of an aqueous solution containing 2.45 g of ammonium sulfamate and further diluting the sample with 101 g of water for a total of 132.5 g of Sample A having a pH of 8.9. Sample B was prepared by taking 25 g of the melamine modified resin of Example 1 which contained in such sample 13.25 g of solids and adding it to an aqueous solution containing 2.08 g of sulfamic acid and further diluting the sample with 93.6 g of water for a total of 132.5 g of Sample B having a pH of 5.0.

The results of the test are shown in Table 2 below wherein time is measured in minutes (min.) or hours (hrs.). NM means that tests were not made at that time level. The stability was measured by acid dilutability NTU's.

The results of Table 2 below indicate that the useable shelf life of Sample B was about 3 hours whereas that of the higher pH Sample A was about 48 hours.

TABLE 2

| Time | Sample A, NTU | Sample B, NTU |
| --- | --- | --- |
| 0 | N.M. | N.M. |
| 30 min. | 1.4 | 2.3 |
| 60 min. | N.M. | 2.7 |
| 70 min. | N.M. | 2.9 |
| 120 min. | 1.7 | 3.2 |
| 150 min. | 1.8 | 4.4 |
| 180 min. | 1.5 | 130 |
| 210 min. | 1.5 | 619 |
| 300 min. | 1.5 | 1350 |
| 400 min. | 1.4 | N.M |
| 23 hrs. | 1.1 | N.M. |

TABLE 2-continued

| Time | Sample A, NTU | Sample B, NTU |
|---|---|---|
| 44 hrs. | 1.0 | N.M. |
| 48 hrs. | 30 | N.M. |

EXAMPLE 3

Preparation of Binder with Ammonium Sulfate Having 25.1% Solids

To 15.5 parts of the fundamental melamine modified resin of Example 1 which contained 53.08% of solids there was added 4.4 pounds (2 kg.) of a 20% aqueous solution of ammonium sulfate and 16.4 pounds (7.4 kg) of water, for a total of 36.3 pounds (16.5 kg) of binder composition. The binder had a pH of 8.9 after 2 hours at room temperature. The binder was then applied to glass fibers by the special procedure of U.S. Pat. No. 5,324,337 of C. Helbing which issued on Jun. 28, 1994 and which is incorporated by reference in its entirety herein. Resinated glass wool samples with a loss on ignition (LOI) of about 18% were thus produced. The samples were cured for 60 seconds at 400° F. (204.4° C.) and tested according to General Motors test method GM9209P for trimethyl amine content in the water used for the test and it was found to be less than 1 part per million.

EXAMPLE 4

Preparation of Binder from the Melamine Modified Resin

In the manner of Example 1, there was prepared a melamine modified resin binder of this invention which had the following properties: about 0.3% free formaldehyde; a refractive index of 1.4920; a pH of 9.62; solids content of 52.5%; Acid Dilute NTU's of 2.6 and 8.2 after one month storage at 45° F. (7° C.); a free phenol content of 2.65%; resin NTU's of 5.4 after 1 month at 7° C. which demonstrated clarity and no separation of solids for a still stored resin with no agitation.

A 429.2 pound (195 kg) batch of binder was prepared by mixing 255 pounds (115.7 kg) of the above melamine modified resin having 133.9 pounds (60.7 kg) of solids, 101.2 pounds (46 kg) of water, 72.4 pounds (32.8 kg) of an ammonium sulfate solution at 20% solids (14.5 pounds (6.6 kg) of solids); and 0.6 pounds (0.27 kg)(of A1100 silane, a product of the Union Carbide Company. The binder had 29.1% of resin solids; 34.7% of oven total solids; a density of 9.41 pounds (4.24 kg)per gallon and a pH of 8.9. The binder was diluted in-line to approximately 27% solids with 30 gallons (960 L) of 2% solids carbon black dispersion having a pH of 7.71 added to each 100 gallons (3200 L) of the above 34.7% solids binder immediately prior to spraying on to fiberglass. The binder had a pH of about 6.8 after its application on to the fiberglass as determined by immersing samples of the resinated wool material into distilled water and checking the pH.

EXAMPLE 5

Preparation and Tests of Resins For Comparative Purposes

In a reactor equipped with agitator and heating means there was added 8.14 parts of water, 32.6 parts of phenol and 5.21 parts of 50% aqueous solution of sodium hydroxide. The temperature was then adjusted to 50° C. under 27 inches (686 mm)of mercury vacuum. 54.1 parts of 50% aqueous formaldehyde is added to the reactor at a steady rate over a period of 70 minutes. The temperature was held at 50° C. with the 27 inches (686 mm) of vacuum for another 15 minutes. The vacuum was then reduced to 24.5 inches (622 mm) and the temperature was allowed to rise to 60° C. in 30 minutes. The temperature of the reaction mixture was held at 60° C. for about 320 minutes. The reaction mixture was then refluxed and cooled to 50° C. Cooling was continued to below 25° C. while maintaining the 27 inches (686 mm) of vacuum. The agitator was then stopped and the vacuum was released immediately before discharging the comparative phenol-formaldehyde resin product.

The comparative resin had a pH of about 9.4, a solids content of 49%, a phenol content of about 0.9%; a free formaldehyde content of 2.8%; and a formaldehyde to phenol mole ratio in the condensation product of 2.6.

To 166 g (grams) of the above fundamental resin there was added 9.8 g of melamine providing a formaldehyde to melamine mole ratio of 1.99. The reaction mixture was then heated to 60° C. for 20 minutes at which time all of the melamine had dissolved. The resin was then cooled, refrigerated and then, 2 g of seed crystals containing a mixture of methylolmelamine and tetradimers (tetramethylol diphenyl methanes) crystals were added to the comparative melamine modified PF resin and the mixture divided into 3 samples of equal weight. The seed crystals encourage the formation of sediment in the resin. The samples were maintained under a temperature of 26° F. (−3.3° C.), 36° F. (2.2° C.), and 46° F. (7.8° C.) respectively. Each of the seeded samples had an initial resin turbidity reading of 125 NTU. After 24 hours, the samples at 26° F., 36° F. and 46° F. were milky and had massive separation of solids whereas the melamine modified PF resin of Example 1, as shown in the following Example 6, at the same temperature did not progress to a milky condition (more than about 1,000 NTU,s) for at least two weeks under the same test conditions.

EXAMPLE 6

Stability Test of the Example 1 Melamine Modified Phenol-Formaldehyde Resin

To 235 g of the melamine modified PF resin of Example 1 there was added 2 g of seed crystals containing the same mixture of methylolmelamine and tetradimer crystals as in Example 5 above. The 235 g sample was then divided into 3 samples of equal weight and the samples maintained at 26° F. (−3.3° C.), 36° F. (2.2° C.), and 46° F. (7.8° C.). The following Table 6 shows the progress of sedimentation in the 3 unagitated samples by showing the resin turbidity in NTU's versus elapsed time in storage. The initial resin NTU readings were taken at the time the samples were prepared whereas the Day 1 readings, Day 4 readings, etc were taken consecutively on the following days as indicated after the initial reading. Higher NTU readings indicate greater turbidity which indicates increasing amounts of solids separation.

TABLE 6

| | Resin NTU Readings | | |
|---|---|---|---|
| | 26° F. (−3.3° C.) | 36° F. (2.2° C.) | 46° F. (7.8° C.) |
| Initial | 75 | 75 | 75 |
| Day 1 | 87 | 81 | 81 |
| Day 3 | 112 | 122 | 112 |
| Day 7 | 365 | 285 | 226 |
| Day 17 | 1269 | 959 | 1209 |

EXAMPLE 7

Variations in Melamine Concentration

The fundamental phenol-formaldehyde resin of Example 1 (the resin prior to addition of melamine) which is also referred to as Resin A was compared with the comparative phenol-formaldehyde resin of Example 5 which is referred to as Resin B at different concentrations of melamine over a period of time. It can be seen from the below Table 7 that the sample of the fundamental resin of Example 1 (Resin A) was much more stable as compared to comparative Resin B which contained melamine concentrations which overlapped those of Resin A.

Mixtures of the fundamental resin of Example 1 containing 0, 1, 2, 3, 4, and 5 pph (parts per hundred) of melamine based on the weight of resin were heated at 60° C. for thirty minutes to dissolve the melamine respectively, providing formaldehyde to dissolved melamine mole ratios of infinity, 3.78, 1.89, 1.26, 0.94, and 0.76. These samples were chilled immediately and seeded with 0.5 pph of a mixture of methylolmelamine and tetradimer crystals with agitation. Each of the 5 samples were then placed in turbidimeter vials and stored at 45° F. (7.2° C.). The initial resin turbidity, measured as NTU's was recorded and then monitored daily. The comparative resin of Example 5 was heated with melamine in the same manner as that of Example 1 above except that the amount of melamine was 0, 2, 4, 6, and 8 pph based on the comparative resin, respectively, providing formaldehyde to dissolved melamine mole ratios of infinity, 5.88, 2.94, 1.96 and 1.47. In the same manner as with the melamine treated resins of the fundamental resin of Example 1, the samples were chilled and seeded. The results of this example are shown in Table 7 below. Entries under the temperature readings versus elapsed time in storage are in resin NTU's. Resin A in Table 7 is the fundamental resin of Example 1 whereas Resin B is the comparative resin of Example 5. The samples in this example were held in storage at 45° F. under continuous agitation. The entries for the fist day of the various concentrations which are asterisked are the initial NTU's.

TABLE 7

| RESIN A | | RESIN B | |
|---|---|---|---|
| pph melamine | 45° F. (7.22° C.) | pph melamine | 45° F. (7.22° C.) |
| 0 pph* | 63 NTU | 0 pph* | 69 NTU |
| 1 pph* | 68 NTU | 2 pph* | 640 NTU |
| 2 pph* | 80 NTU | 4 pph* | milky |
| 3 pph* | 70 NTU | 6 pph* | milky |
| 4 pph* | 75 NTU | 8 pph* | milky |
| 5 pph* | 71 NTU | — | — |

TABLE 7-continued

| RESIN A | | RESIN B | |
|---|---|---|---|
| pph melamine | 45° F. (7.22° C.) | pph melamine | 45° F. (7.22° C.) |
| TWO DAYS AFTER THE INITIAL READINGS | | | |
| — | — | 0 pph | 190 NTU |
| — | — | 2 pph | milky |
| ONE WEEK AFTER THE INITIAL READINGS | | | |
| 0 pph | 1130 NTU | — | — |
| 1 pph | 500 NTU | — | — |
| 2 pph | 1300 NTU | — | — |
| 3 pph | 1180 NTU | — | — |
| 4 pph | 1470 NTU | — | — |
| 5 pph | 190 NTU | — | — |

The test was continued and the samples of Resin A did not become milky until after nine days from the initial readings.

EXAMPLE 8

Effect of Varying the Quantity of Free Formaldehyde in the Fundamental Resin A 4.5 kg sample of the fundamental resin was prepared in the manner of Example 1. The following properties were obtained in this fundamental resin which is also referred to as base resin: free formaldehyde of 1.1%; free phenol of 3.3%; refractive index of 1.4836; salt water tolerance of 148%; viscosity of 21 cps; and solids of 50.2%.

50.2% aqueous formaldehyde was then added to the fundamental resin in progressively increasing amounts to 200 g samples of the above base resole to produce samples with free formaldehyde contents ranging from 1.1% through 6.0%. Melamine was then added to each sample, also in progressively increasing amounts, sufficient to produce a free formaldehyde to melamine mole ratio of 1:1 in each sample. After 80 minutes agitation at 60° C., significant amounts of undissolved melamine remained in all of the samples containing post added formaldehyde and was immediately removed by vacuum filtration. Each prepared sample was then analyzed for % nitrogen, the weight percent of dissolved melamine in each sample calculated and the actual mole ratio of free formaldehyde to dissolved melamine obtained. Each prepared sample was then divided into 65 g quantities in 4 ounce jars and placed in agitated storage at 7 and 14° C. All samples except No. 6 in Table 8 were still clear amber translucent after overnight agitated storage at these temperatures. Sample No. 6 had turned to a solid paste. Five drops of methylolmelamine and tetradimer crystals were then added to each 65 g sample at each temperature and the resin turbidity as measured in NTU's monitored versus elapsed time in agitated storage at 7 and 14° C. The results are shown below in Table 8 A and its continuation which is 8 B. The following abbreviations in Tables 8A and 8B have the indicated meanings: Wt is weight; g is grams; F is formaldehyde; M is melamine; N is nitrogen; PPH is parts per hundred based on resin; Stg-Temp means storage temperature; and NTU means resin nephelometric turbidity units.

It can be seen from Tables 8A and 8B that the melamine modified resin samples having more than 7 parts of melamine per 100 parts of fundamental resin to produce melamine modified resins have poor stability in comparison to samples with about 7 or less parts of melamine for each 100 parts of fundamental resin. Also, it can be seen that resoles prepared with melamine in mole ratios of free formaldehyde to dissolved melamine above about 1.2 are extraordinarily unstable in agitated cold storage whereas samples prepared with a free formaldehyde to dissolved melamine mole ratio of 1.0 or less do not progress to a milky appearance for periods of time exceeding one week under identical storage conditions.

TABLE 8 A

| Sample No. | 1 | 2 | 3 | | |
|---|---|---|---|---|---|
| Wt. Base Resole, g | 200 | 200 | 200 | | |
| Wt of 50.2% of F added, g | 0.0 | 3.7 | 8.0 | | |
| Wt % free F obtained | 1.1 | 2.0 | 3.0 | | |
| Wt M added, g | 9.2* | 17.0 | 26.1 | | |
| Wt % N obtained | 3.04 | 4.49 | 5.47 | | |
| Wt % dissolved M | 4.56 | 6.74 | 8.21 | | |
| PPH dissolved M | 4.78 | 7.23 | 8.94 | | |
| Mole ratio F to dissolved M | 0.97 | 1.16 | 1.41 | | |
| Stg Tem, °C. | 7 | 14 | 7 | 14 | 7 | 8 |
| Initial NTU with Seed Crystals | — | 98.4 | — | 101.2 | — | — |
| NTU after 1 day | 129 | 146 | 137 | 142 | milky | miiky |
| NTU after 3 days | 739 | 300 | 691 | 343 | milky | milky |
| NTU after 7 days | 1000 | 1020 | Milky | Milky | thick sus. | thick sus. |

TABLE 8 B (continuation of 8 A)

| Sample No. | 4 | 5 | 6 | | |
|---|---|---|---|---|---|
| Wt. Base Resole, g | 200 | 200 | 200 | | |
| Wt of F added, g | 12.6 | 17.3 | 22.2 | | |
| Wt % free F obtained | 4.0 | 5.0 | 6.0 | | |
| Wt M added, g | 35.8 | 45.7 | 56.0 | | |
| Wt % N obtained | 6.63 | 7.90 | 8.93 | | |
| Wt % dissolved M | 9.95 | 11.85 | 13.4 | | |
| PPH dissolved M | 11.05 | 13.44 | 15.47 | | |
| Mole ratio F to dissolved M | 1.52 | 1.56 | 1.63 | | |
| Stg Tem, °C. | 7 | 14 | 7 | 14 | 7 | 8 |
| Initial NTU with Seed Crystals | — | — | — | — | Solid paste | |
| NTU after 1 day | Milky | | Milky | | — | |
| NTU after 3 days | Milky | | Milky | | — | |
| NTU after 7 days | Solid Paste | | — | | — | |

*All dissolved; undissolved filtered from all others.

EXAMPLE 9

Storage Stability of Very Low Free Formaldehyde Resoles

A 4.5 kg sample of base resin as prepared in Example 1 was prepared except that after raising the temperature to 60° C. and holding such temperature for four and a half hours, the reaction mixture was held at 60° C. for only 203 minutes. 2.0 kg were withdrawn from the reaction mixture and then chilled. This base or fundamental resin is referred to herein as Resole A. The remainder of the reaction mixture was chilled after a total of 260 minutes at 60° C. and is referred to herein as Resole B. The following properties were obtained on the two samples:

| | Resole A | Resole B |
|---|---|---|
| Time at 60° C. | 203 minutes | 260 minutes |
| Salt Water Tolerance | 155 | 126 |
| % Free formaldehyde | 1.0 | 0.75 |
| % Free Phenol | 2.98 | 2.59 |
| Refractive Index | 1.4835 | 1.4846 |
| % Solids | 50.18 | 50.48 |

3, 4, and 5 parts per hundred (pph),(based on the amount of resin), of melamine were than added with agitation at 60° C. to 250 grams portions of Resole A and 2, 3, and 4 pph melamine to 250 grams portions of Resole B to produce the samples A3, A4, A5, B2, B3 and B4 respectively in Table 9. Dashes (--) in Table 9 indicate that no reading was made at that time. The free formaldehyde to melamine mole ratio was calculated for each sample. After 20 minutes at 60° C. half of each sample was removed from the 60° C. water bath and chilled and the remainder conditioned for a total of 80 minutes at 60° C., before chilling, producing a total of 12 samples. Each sample was then decanted from any undissolved melamine after overnight storage at 45° F. (7.22 ° C.), and then seeded with 10 drops of seed material slurry containing methylolmelamine and tetradimer for each approximate 125 grams sample in eight ounce jars. Each sample was then divided in half again to yield an approximate 60 gram quantity in four ounce jars each having a 0.5 inch magnetic stir bar so that each of the above 12 samples was tested in agitated storage at the two temperatures of 7 and 14° C. Samples were placed in water baths on top of a multihead stir plates (Cole Parmer 15 position, Model E-04656-30) inside refrigerated compartments to obtain identical test conditions at each of the two temperatures evaluated.

Resin turbidity in NTU's for each sample was monitored versus elapsed storage time at each temperature. The results are shown in Tables 9A-1, 9A-2, 9B-1 and 9B-2.

TABLE 9

Dissolution Rate [in minutes (min)] of Added Melamine in Resole Samples vs Elapsed Time at 60° C.

| Sample No. | A3 | A4 | A5 | B2 | B3 | B4 |
|---|---|---|---|---|---|---|
| Appearance after Melamine Addition | | | | | | |
| Substantially dissolved | 8 | 15 | 20 | 4 | 7 | 14 |
| Severe undissolved | — | — | 20 | — | — | — |
| Significant undissolved | — | — | 28 | 6 | 13 | — |
| Trace undissolved | 12 | 20 | 50 | 10 | 16 | 20 |
| Few Particles | — | 25 | 80 | — | 20 | 33 |
| All dissolved | 17 | 30 | — | 13 | 25 | 40 |
| Formaldehyde to dissolved melamine mole ratio | 1.40 | 1.05 | 0.84 | 1.58 | 1.05 | 0.79 |

TABLE 9A

Storage Stability of Resole A with Melamine

| pph Dissolved Melamine | 3 | | | | 4 | | | | 5 | | | |
|---|---|---|---|---|---|---|---|---|---|---|---|---|
| Reaction Time, min. | 20 | | 80 | | 20 | | 80 | | 20 | | 80 | |
| Storage Temp., °C. | 7 | 14 | 7 | 14 | 7 | 14 | 7 | 14 | 7 | 14 | 7 | 14 |
| Resin NTU's, | | | | | | | | | | | | |
| initial after 16 hours mix on seed crystals | 69 | 71 | 75 | 65 | 64 | 85 | 70 | 58 | 309 | 408 | 70 | 90 |
| After two days | 146 | 96 | 130 | 119 | 202 | 137 | 132 | 93 | 690 | 1039 | 111 | 159 |
| After three days | 340 | 175 | 250 | 181 | 488 | 183 | 198 | 102 | 1000+ | 1000+ | 146 | 283 |
| After four days | 675 | 262 | 508 | 282 | 1058 | 292 | 398 | 172 | milky | milky | 363 | 541 |
| After five days | 1110 | 407 | 952 | 477 | 1000+ | 426 | 735 | 245 | — | — | 615 | 85 |
| After six days | 1000+ | 585 | 1270 | 617 | milky | 610 | 965 | 352 | — | — | 885 | 1065 |
| After seven days | milky | 845 | 1000+ | 885 | — | 803 | 1320 | 510 | — | — | 1048 | 1000+ |

TABLE 9B

Storage Stability of Resole B with Melamine

| pph Dissolved Melamine | 2 | | | | 3 | | | | 4 | | | |
|---|---|---|---|---|---|---|---|---|---|---|---|---|
| Reaction Time, min. | 20 | | 80 | | 20 | | 80 | | 20 | | 80 | |
| Storage Temp., °C. | 7 | 14 | 7 | 14 | 7 | 14 | 7 | 14 | 7 | 14 | 7 | 14 |
| Resin NTU's, | | | | | | | | | | | | |
| initial after 16 hours mix on seed crystals | 70 | 63 | 74 | 67 | 64 | 90 | 70 | 60 | 96 | 188 | 54 | 69 |
| After two days | 182 | 141 | 310 | 123 | 223 | 156 | 281 | 116 | 280 | 394 | 100 | 85 |
| After three days | 566 | 219 | 1002 | 212 | 574 | 272 | 753 | 207 | 712 | 675 | 336 | 215 |
| After four days | 1185 | 452 | 1000+ | 438 | 1222 | 477 | 1420 | 302 | 1310 | 1046 | 1080 | 410 |
| After five days | 1000+ | 780 | milky | 698 | 1000+ | 780 | 1000+ | 680 | 1000+ | 1000+ | 1000+ | 680 |
| After six days | milky | 1152 | — | 1048 | milky | 1105 | milky | 875 | milky | milky | milky | 955 |
| After seven days | — | 1000+ | — | 1000+ | — | 1000+ | — | 1272 | — | — | — | 1239 |

What is claimed is:

1. A curable, resinous composition comprising the reaction product of:
   (A) an aqueous, alkaline, initial phenol-formaldehyde resole resin having about 1.8 to 2.4 moles of formaldehyde condensed with each mole of phenol, about 35% to 65% by weight of solids and containing from about 0.7% to 2% by weight of free formaldehyde; and
   (B) 1 to 7 parts by weight of a symmetrical triazine selected from the group consisting of melamine and ammeline dissolved in each 100 parts by weight of the initial resin with a mole ratio of dissolved triazine to free formaldehyde in the initial resin of one mole of triazine for each 0.5 to 1.2 moles of free formaldehyde, said triazine reacted with the free formaldehyde in the initial resin under reaction conditions sufficient to reduce the free formaldehyde to less than about 70% by weight of that in the initial resin and wherein the composition contains less than 0.7% by weight of free formaldehyde.

2. The composition of claim 1 wherein the triazine is melamine.

3. The composition of claim 2 which has infinite water dilutability at a pH of 7.5 to 9.

4. The composition of claim 3 having a pH of about 9 to 10.5.

5. The composition of claim 3 wherein the melamine is reacted with the free formaldehyde by heating at a temperature of at least 50° C.

6. The composition of claim 3 wherein the melamine is reacted with the free formaldehyde by heating at a temperature of 50° C. to 70° C. for about 15 minutes to 3 hours.

7. The composition of claim 3 which upon storage does not form an insoluble phase for a period of at least two weeks at a temperature of less than 40° F. in unagitated still storage.

8. The composition of claim 3 wherein the amount of free formaldehyde after reaction with melamine is decreased by at least 50% by weight of that in the initial resin and wherein said composition is prepared entirely in the alkaline range.

9. The composition of claim 3 having: a solids content of about 40 to 60%; a free phenol content of about 1 to 5%; a pH of about 9 to 10.5; and less than 0.5% of free formaldehyde, said percentages being by weight.

10. The composition of claim 3 wherein the initial resin has, a solids content of 45% to 55% by weight and the free formaldehyde is reduced to less than 0.5% by weight after reaction with melamine.

11. A binder having a pH of about 8 to 10.5 comprising an aqueous solution of:
   (A) the resinous composition of claim 1;
   (B) an ammonium salt of a strong acid in an amount sufficient to decrease the pH of the binder to less than 6 during curing of the resin; and
   (C) water in an amount sufficient to provide from about 0.5 to 35% by weight of solids in the binder.

12. The binder of claim 11 wherein the resinous composition of claim 1 comprises melamine as the triazine to form a methylolmelamine compound in a common aqueous solvent with the initial phenol-formaldehyde resin, said resin having infinite water dilutability at a pH of 7.5 to 9, about 35% to 65% solids by weight and said methylolmelamine formed at a pH of about 9 to 10.5 at a temperature of about 50° C. to 70° C. for about 15 minutes to three hours to produce a melamine modified resin and wherein the melamine modified resin has an acid dilutability of less than 500 NTU.

13. The binder of claim 12 the mole ratio of melamine to free formaldehyde in the initial resin is one mole of melamine for each 0.5 to 1.2 moles of free formaldehyde and the amount of ammonium salt is sufficient to provide a pH of less than 5.5.

14. A process for the preparation of binder-treated fiberglass, which comprises preparing a binder having a pH of about 8 to 10.5 by mixing:

(A) the resinous composition of claim 1;

(B) water; and (D) a latent acid of an ammonium salt of a strong acid in an amount sufficient to provide a pH of less than 6 to the binder upon evaporation of the ammonia; and applying the binder to fiberglass.

15. The process of claim 14 wherein the binder has from about 7% to 35% solids and the resinous composition contains less than 0.5% of free formaldehyde and has an acid dilutability of less than 500 NTU wherein the resinous composition was prepared by reacting from about 1.8 to 2.4 moles of formaldehyde with each mole of phenol under alkaline conditions to first prepare an initial resole resin having a pH of about 9 to 10.5, a solids content of 40 to 60%, all of said percentages being by weight.

16. A resinous composition comprising a curable, clear, aqueous solution of a melamine modified phenol-formaldehyde resole resin having about 35% to 65% by weight of solids, a pH of about 9 to 10.5, less than 0.5% by weight of free formaldehyde, from about 2% to about 9% of methylolmelamines, said resin containing the resinous residue of 1.8 to 2.4 moles of formaldehyde reacted with each mole of phenol and wherein said composition has infinite water dilutability at a pH of 7.5 to 9 and an acid dilutability of less than 500 NTU, said composition prepared entirely in the alkaline range.

17. An alkaline, water soluble and curable resinous composition of phenol-formaldehyde resin containing less than 0.7% of free formaldehyde and which does not form precipitates when diluted with from 1 to 3 parts of water at a pH of 7.5 to 9, said resin containing the reaction product of melamine and formaldehyde formed from the reaction of melamine with a phenol-formaldehyde resin containing free formaldehyde, said composition prepared by heating at a temperature of at least 50° C.:

(A) an initial phenol-formaldehyde resole resin having about one mole of phenol condensed with about 1.8 to 2.4 moles of formaldehyde, a solids content of about 40 to 60%, a pH of about 9 to 10.5, and containing from about 0.5% to 2% of free formaldehyde; with (B) 1 to 7 parts of melamine dissolved in each 100 parts of initial resin within a molar ratio of one mole of melamine for each 0.5 to 1.2 moles of free formaldehyde to modify the initial resin by reacting the melamine with the free formaldehyde and reducing the free formaldehyde in the initial resin by at least 50%, all of said percentages and parts being by weight.

18. A method for preparing a curable melamine modified phenol-formaldehyde resole resin containing less than 0.7% of free formaldehyde which comprises: reacting about one mole of phenol with 1.8 to 2.4 moles of formaldehyde at a pH of about 9 to 10.5 in an aqueous medium to prepare an initial alkaline phenol-formaldehyde resole resin having from about 0.7 to 2.0% of free formaldehyde and 40% to 60% solids; dissolving melamine in the initial alkaline phenol-formaldehyde resole resin wherein the quantity of melamine is from 1 to 7 parts by weight for each 100 parts by weight of the initial phenol-formaldehyde resin and about one mole of melamine is reacted with 0.5 to 1.2 moles of free formaldehyde in the initial resin; and reacting melamine with the free formaldehyde in the alkaline resole resin to reduce the free formaldehyde content of the melamine modified phenol-formaldehyde resin to less than 70% of the amount in the initial resin, all of said percentages being by weight.

19. The method of claim 18 wherein the initial phenol-formaldehyde resin has infinite water dilutability at a pH of 7.5 to 9 and the final composition maintains such infinite water dilutability.

20. The method of claim 19 wherein the reaction with melamine reduces the free formaldehyde content to less than 60% by weight of the quantity in the phenol-formaldehyde resin before reaction with melamine.

21. The method of claim 18 wherein the reaction of the melamine with the initial resin is conducted at a temperature of at least about 50° C.

22. The method of claim 21 wherein a temperature of about 50 to 70° C. is maintained for about 15 minutes to 3 hours.

23. A B-stage curable glass fiber composition comprising glass fibers having a binder applied thereto wherein the binder is comprised of:

(A) the reaction product of:

(i) an aqueous, alkaline, initial phenol-formaldehyde resole resin having about 1.8 to 2.4 moles of formaldehyde combined with each mole of phenol, a solids content of about 35% to 65%, from about 0.7% to about 2.0% of free formaldehyde; and (ii) 1 to 7 parts of melamine dissolved in each 100 parts of the initial resin with a mole ratio of dissolved melamine to free formaldehyde in the initial resin of one mole of melamine for each 0.5 to 1.2 moles of free formaldehyde, said melamine reacted with the free formaldehyde in the alkaline initial resin under reaction conditions sufficient to reduce the free formaldehyde to less than 70% of the free formaldehyde of the initial resin to produce a melamine modified resin containing less than 0.7% of free formaldehyde; and (B) an ammonium salt of a strong aqueous soluble acid, the quantity of said salt being sufficient to lower the pH of the composition to less than 6 upon curing of the binder, all of said percentages being by weight.

24. The composition of claim 23 wherein the initial phenol-formaldehyde resin has a free formaldehyde content of 0.5 to 1.2%, 1–5 parts of melamine dissolved in 100 parts of the initial resin, infinite water dilutability at a pH of 7.5 to 9, the reaction product maintains such infinite water dilutability and when wound into rolls for storage, the B-stage composition has a shelf life of at least 2 months at 25° C.

25. A C-stage glass fiber composition comprising glass fibers shaped to a desirable configuration having a cured low formaldehyde, triazine modified, phenol-formaldehyde binder applied thereto, said binder prepared by:

(A) reacting (I) an initial aqueous, alkaline phenol-formaldehyde resole resin having a molar ratio of 1.8 to 2.4 moles of formaldehyde for each mole of phenol, from about 40 to 60% by weight of solids, about 1 to 5% by weight of free phenol and from 0.5 to 2.0% by weight of free formaldehyde with (ii) a triazine selected from the group consisting of melamine and ammeline wherein the amount of triazine is equal to about 1 to about 7 parts by weight for each 100 parts by weight of the initial resin and the molar ratio of triazine to free formaldehyde is about 1 mole of triazine for each 0.5 to 1.2 moles of free formaldehyde to prepare a triazine modified resin containing less than 0.7% by weight of free formaldehyde and wherein the free formaldehyde of the triazine modified resin is less than 70% by weight of that in the initial resin; and (B) adding water and a latent catalyst of an ammonium salt of a strong acid to the triazine modified resin to prepare a binder having about 10% to 35% by weight of solids, said binder having a pH of about 8 to 10 and wherein the amount of latent catalyst is sufficient to impart a pH of less than 6 on curing of the binder.

26. The composition of claim 25 wherein: the triazine is melamine, the molar ratio of melamine to free formaldehyde is about 1 mole of melamine for each 0.5 to 1.2 moles of free formaldehyde to prepare a melamine modified resin having an acid dilutability of less than 500 NTU and less than 0.5% of free formaldehyde and wherein the melamine modified resin of the binder is prepared entirely in the alkaline range.

* * * * *